(12) United States Patent
Lance et al.

(10) Patent No.: US 9,118,384 B2
(45) Date of Patent: Aug. 25, 2015

(54) PAYLOAD FOR A MULTI-BEAM SATELLITE

(75) Inventors: Emmanuel Lance, Clichy (FR); Hector Fenech, Issy les Moulineaux (FR)

(73) Assignee: EUTELSAT S A, Paris (FR)

( * ) Notice: Subject to any disclaimer, the term of this patent is extended or adjusted under 35 U.S.C. 154(b) by 426 days.

(21) Appl. No.: 13/497,889

(22) PCT Filed: Sep. 24, 2010

(86) PCT No.: PCT/EP2010/064184
§ 371 (c)(1),
(2), (4) Date: Jun. 1, 2012

(87) PCT Pub. No.: WO2011/036271
PCT Pub. Date: Mar. 31, 2011

(65) Prior Publication Data
US 2012/0231728 A1    Sep. 13, 2012

(30) Foreign Application Priority Data

Sep. 24, 2009 (FR) ...................................... 09 56616

(51) Int. Cl.
*H04B 7/185* (2006.01)
*H04B 7/204* (2006.01)

(52) U.S. Cl.
CPC .......... *H04B 7/18515* (2013.01); *H04B 7/2041* (2013.01)

(58) Field of Classification Search
CPC .......................... H04B 7/18515; H04B 7/2041
See application file for complete search history.

(56) References Cited

U.S. PATENT DOCUMENTS

| | | | |
|---|---|---|---|
| 2003/0134595 A1* | 7/2003 | DiCamillo et al. | 455/13.4 |
| 2006/0002347 A1* | 1/2006 | Thompson et al. | 370/335 |
| 2008/0146145 A1 | 6/2008 | Pateros et al. | |
| 2008/0233865 A1* | 9/2008 | Malarky et al. | 455/12.1 |
| 2009/0291633 A1* | 11/2009 | Dankberg et al. | 455/12.1 |

FOREIGN PATENT DOCUMENTS

| | | |
|---|---|---|
| EP | 1 973 240 B1 | 7/2010 |
| WO | WO 2004/103325 A1 | 12/2004 |
| WO | WO 2008/108885 A2 | 9/2008 |

OTHER PUBLICATIONS

International Search Report as issued for PCT/EP2010/064184.

* cited by examiner

*Primary Examiner* — Edward Urban
*Assistant Examiner* — Mohammed Rachedine
(74) *Attorney, Agent, or Firm* — Pillsbury Winthrop Shaw Pittman LLP

(57) ABSTRACT

A payload includes one or more antennas for receiving polarized radiofrequency signals; a device for regenerating radiofrequency signals by filtering, frequency transposition, and amplification; and antennas for transmitting the regenerated radiofrequency signals to one or more terrestrial terminals. The radiofrequency signal regeneration device includes a plurality of regeneration channels, each channel consisting of an amplification device capable of amplifying two radiofrequency signals having separate frequency bands and the transmission antennas associated with a regeneration chain are capable of transmitting two regenerated radiofrequency signals having orthogonal polarization directions and intended for cells belonging to a single cell layout that uses at least two separate frequency bands and two separate polarizations.

4 Claims, 7 Drawing Sheets

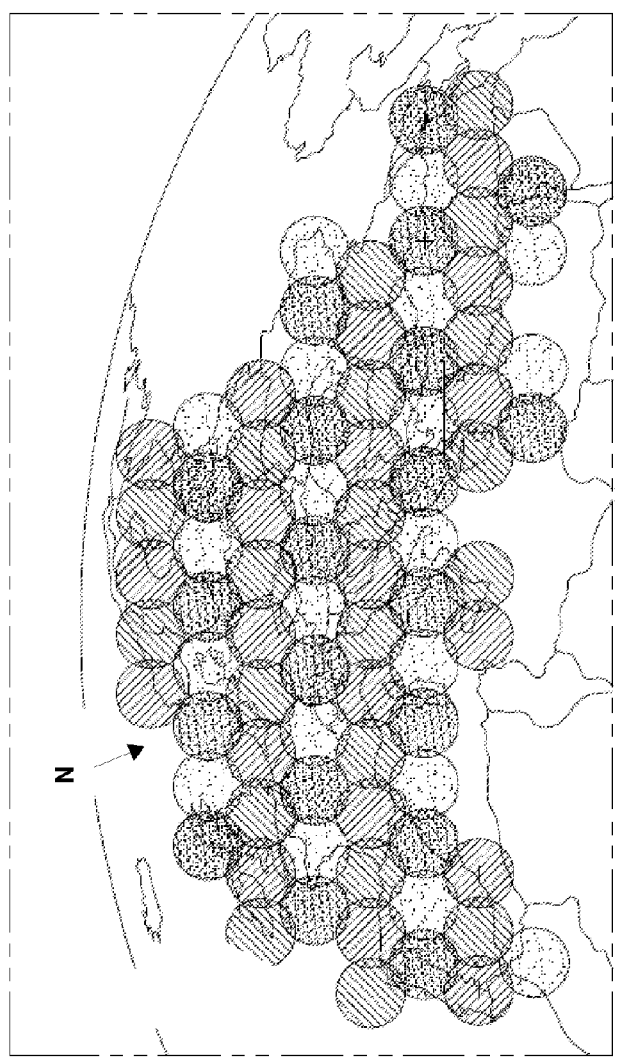
FIG. 3
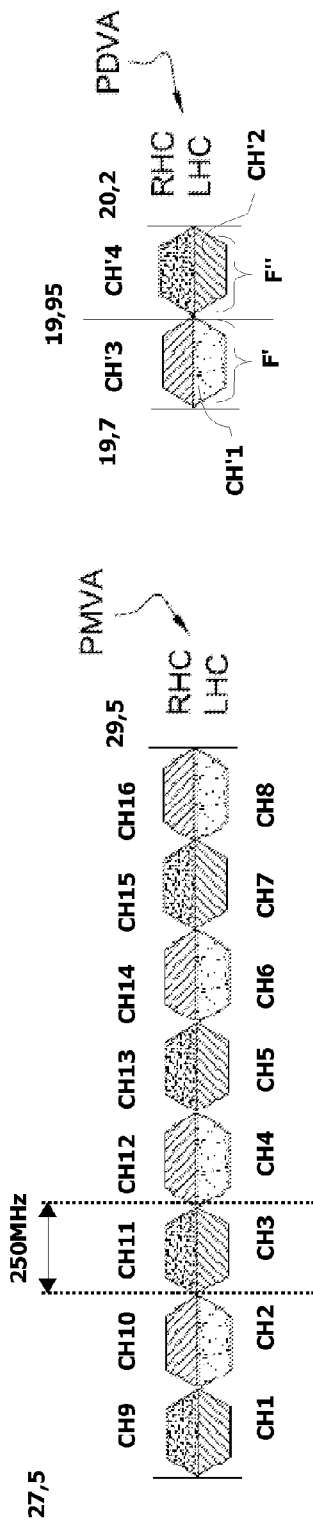
FIG. 4
FIG. 5

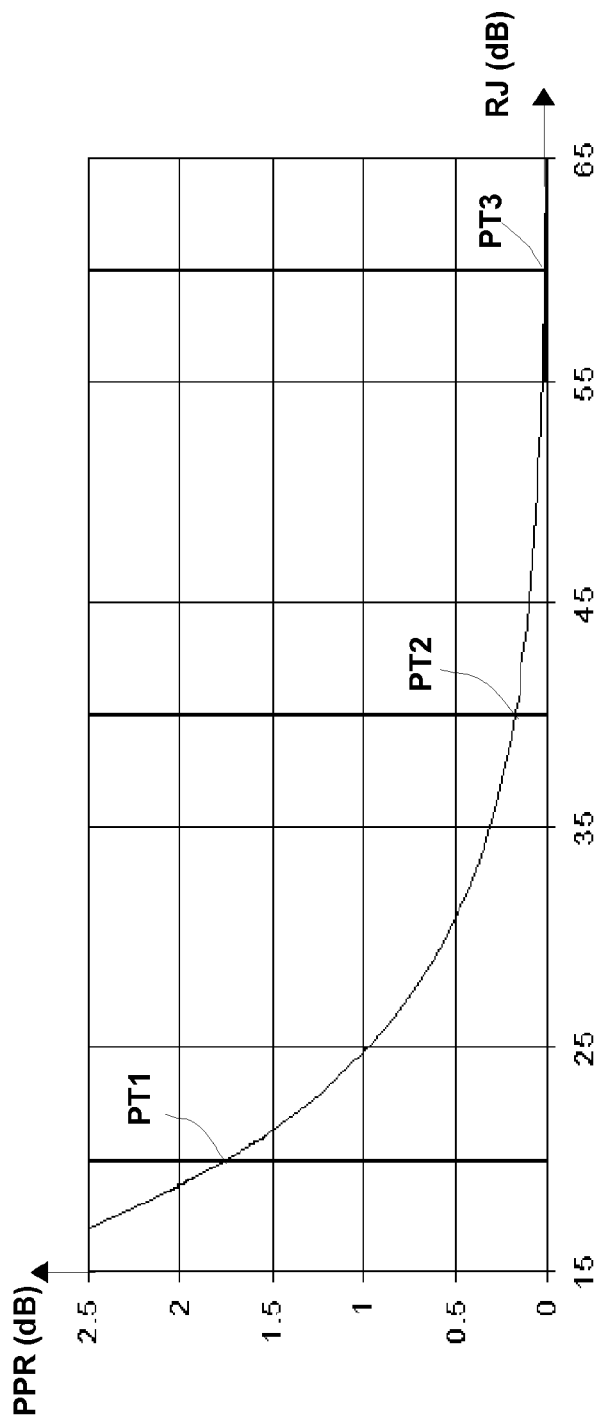

PAYLOAD FOR A MULTI-BEAM SATELLITE

CROSS REFERENCE TO RELATED APPLICATIONS

This application is the U.S. National Stage of PCT/EP2010/064184, filed Sep. 24, 2010, which in turn claims priority to French Patent Application No. 0956616, filed Sep. 24, 2009, the entire contents of all applications are incorporated herein by reference in their entireties.

TECHNICAL FIELD OF THE INVENTION

The present invention relates to a forward link payload for a multi-beam satellite, a forward link allowing receipt of radiofrequency signals from at least one main terrestrial station so as to re-transmit said signals to at least one terrestrial terminal, said payload comprising:
- one or more reception antennas for receiving polarised radiofrequency signals;
- a regeneration device for regenerating radiofrequency signals by filtering, frequency transposition and amplification; and
- transmission antennas for transmitting the regenerated radiofrequency signals to one or more terrestrial terminals, each signal being destined for a single basic coverage area called a cell.

The present invention is applied particularly in the field of multi-beam satellites.

TECHNICAL BACKGROUND OF THE INVENTION

In the field of multi-beam satellites, a known prior art forward link payload for a multi-beam satellite, a forward link allowing receipt of $N_{GW}$ radiofrequency signals from at least one main terrestrial station so as to re-transmit said signals to at least one terrestrial terminal, comprises:
- one or more reception antennas for receiving polarised radiofrequency signals;
- a regeneration device for regenerating radiofrequency signals, also called a repeater, comprising:
  - $N_{GW}$ low noise amplifiers LNA for amplifying each of the radiofrequency signals;
  - $N_{GW}$ signal divider devices for separating each radiofrequency signal distributed over $N_{GW}$ uplink channels;
  - $N_C$ frequency converter circuits generally for frequency translating and filtering the $N_{GW}$ radiofrequency signals so as to re-distribute said signals in accordance with a frequency plan of the downlink over $N_C$ downlink channels;
  - $N_C$ high-power amplifiers for amplifying the $N_C$ downlink radiofrequency signals; and
  - $N_C$ output bandpass filters for filtering each of the $N_C$ radiofrequency signals.
- transmission antennas for transmitting the regenerated radiofrequency signals to one or more terrestrial terminals, each signal being associated with a single basic coverage area called a cell.

A drawback of this prior art is that this leads to the use of a very considerable number of components, which leads to a significant increase in the mass of the multi-beam satellite.

In addition, patent application WO 2004/103325 describes a multi-beam satellite using two cell plannings of the honeycomb type superposed on one another in an offset manner. Each cell planning uses three different frequency bands and the same given polarisation for all their cells, which makes it possible to use a six-colour frequency re-use pattern. The polarisation used by one cell planning is orthogonal to the polarisation used by the other cell planning. The superposition of the two layouts combined with the orthogonal arrangement of the polarisations of the two layouts makes it possible to obtain central regions in which the interferences between cells are reduced.

A drawback of this prior art is that the frequency re-use pattern is not optimal.

GENERAL DESCRIPTION OF THE INVENTION

The object of the present invention is to provide a payload which makes it possible to reduce the "dry" mass of a multi-beam satellite (that is to say the mass of the multi-beam satellite without fuel) whilst using a more effective frequency re-use pattern.

In accordance with a first subject of the invention, this object is achieved by a forward link payload for a multi-beam satellite, a forward link allowing receipt of radiofrequency signals from at least one main terrestrial station so as to re-transmit said signals to at least one terrestrial terminal, said payload comprising:
- one or more reception antennas for receiving polarised radiofrequency signals;
- a regeneration device for regenerating radiofrequency signals by filtering, frequency transposition and amplification; and
- transmission antennas for transmitting the regenerated radiofrequency signals to one or more terrestrial terminals, each signal being destined for a single basic coverage area, called a cell, characterised in that the regeneration device for regenerating radiofrequency signals comprises a plurality of regeneration chains, each chain comprising an amplification device able to amplify two radiofrequency signals having different frequency bands, and in that the transmission antennas associated with a regeneration chain are able to transmit two regenerated radiofrequency signals having orthogonal directions of polarisation and destined for cells belonging to a single cell planning which uses at least two frequency bands and two different polarisations.

As will be seen in detail hereinafter, the use of one regeneration chain for management of two radiofrequency signals makes it possible to reduce the number of chains used and therefore to reduce the dry mass of the multi-beam satellite, without having a multi-path effect on a radiofrequency signal thanks to the combination of radiofrequency signals having orthogonal directions of polarisation.

In accordance with non-limiting embodiments, the forward link payload may further comprise one or more additional features from the following:
- the transmission antennas associated with a regeneration chain are able to transmit two regenerated radiofrequency signals by said amplification device to two non-contiguous cells. This makes it possible to obtain spatial isolation and to thus further reduce the multi-path effects between the radiofrequency signals at the output of the multi-beam satellite.
- an amplification device comprises a channel amplifier and a travelling wave tube amplifier.

In accordance with a second subject, the invention relates to a multi-beam satellite comprising a payload characterised by a forward link according to at least one of the above features.

In accordance with a third subject, the invention relates to a telecommunications network for establishing radiofrequency links between at least one main terrestrial station and at least one terrestrial terminal via a multi-beam satellite, said network comprising at least one main terrestrial station, at least one terrestrial terminal, and a multi-beam satellite, in accordance with which the multi-beam satellite comprises a payload according to at least one of the above features.

The invention and its various applications will be better understood upon reading the following description and studying the accompanying figures.

BRIEF DESCRIPTION OF THE FIGURES

The figures are given merely by way of indication and in no way limit the invention.

FIG. 3 illustrates a four-colour pattern for a European coverage area used by the payload of FIG. 2;

FIG. 4 illustrates uplink frequency channels used by the forward link payload of FIG. 2;

FIG. 5 illustrates downlink frequency channels used by the forward link payload of FIG. 2;

FIG. 12 is a first power curve of a ripple of a radiofrequency signal received by the payload of FIG. 2 as a function of overall rejection.

DETAILED DESCRIPTION OF THE INVENTION

Figure 1:
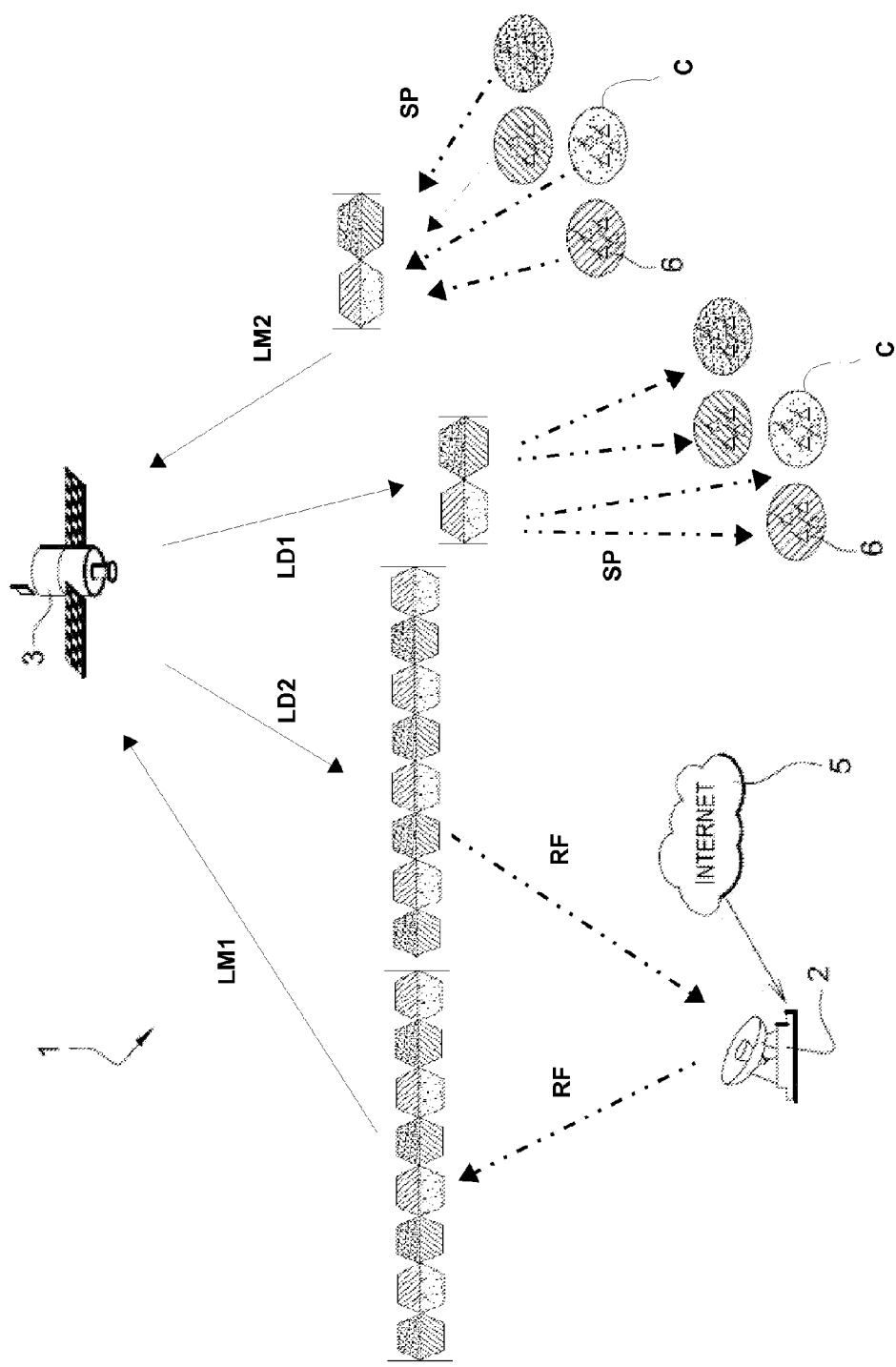
FIG. 1 is a simplified schematic view of a telecommunications network comprising a multi-beam satellite comprising a payload according to the invention.

Like elements are denoted by like reference numerals in all the figures.

FIG. 1 illustrates a telecommunications network 1 for establishing radiofrequency links between at least one main terrestrial station 2 and at least one terrestrial terminal 6 via a multi-beam satellite 3. Such a network is also called a satellite telecommunications network.

In practice, the telecommunications network 1 is formed by a plurality of main terrestrial stations 2 which are interconnected via a terrestrial network (Internet network in a non-limiting example). It should be noted that, in a non-limiting example, a main terrestrial station 2 (also called a central station) is a terrestrial "gateway" connected to an Internet backbone 5.

In particular, the multi-beam satellite 3 comprises
a payload according to the invention; and
a platform.

The payload of a multi-beam satellite 3 denotes the part which allows said satellite to carry out the task for which it was designed, that is to say, in particular for a multi-beam satellite 3 as shown in FIG. 1, to ensure receipt, processing (filtering, frequency transposition, amplification) and re-transmission of telecommunications signals from the main terrestrial station 2 to terrestrial terminals 6, or the re-transmission of telecommunications signals from terrestrial terminals 6 to the main terrestrial station 2. A payload thus comprises in particular antennas and repeaters, whereas a platform comprises in particular control, propulsion or electrical power equipment.

Figure 6:
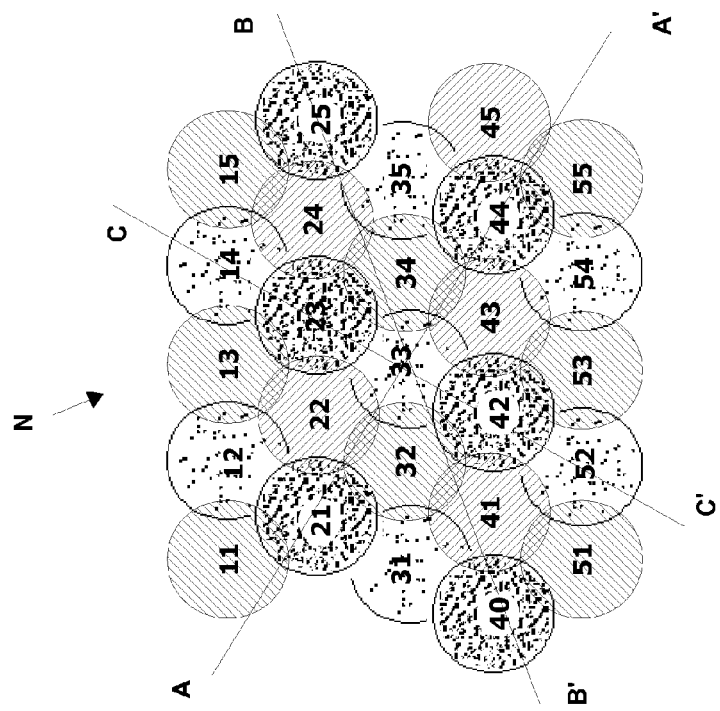
FIG. 6 illustrates part of the four-colour pattern of FIG. 4 with axes of displacement.

A multi-beam satellite 3 allows use of a plurality of radiofrequency signals SP to cover basic coverage areas called cells C which belong to a single cell planning N (as illustrated in FIG. 3 and in part in FIG. 6). "Cell planning" means a network of cells in which a cell is surrounded by maximum of six cells. The cells are circular areas which overlap so as to cover a specific geographical area. A plurality of radiofrequency links occupying the same frequency band can also be established over different radiofrequency signals SP so as to cover cells, for example which are contiguous.

It should be noted that "radiofrequency signal" means a signal which is received/transmitted over a specific bandwidth and in a specific frequency channel of this bandwidth. In addition, a radiofrequency signal comprises a plurality of primary signals destined for a plurality of users or provided by a plurality of users, said primary signals having the same direction of polarisation and having both different frequencies (in the channel) and different transmission/receipt times.

If the satellite telecommunications network is a broadband network, the multi-beam satellite 3 is used in a bi-directional manner, that is to say to both:

relay data transmitted by the main terrestrial station 2 (connected to the terrestrial network) to one or more terrestrial terminals 6: This first link, of the point to multipoint type, is called the forward link;

relay to the main terrestrial station 2 the data transmitted by one or more terrestrial terminals 6: This second link, of the multipoint to point type, is called the return link.

As will be seen hereinafter,
in the forward link, radiofrequency signals RF are sent over a link called an uplink LM1 to the multi-beam satellite 3 by the main terrestrial station 2, as illustrated in FIG. 1. These radiofrequency signals RF are then processed at the multi-beam satellite 3, then re-transmitted over a link called a downlink LD1 to the terrestrial terminals 6, as illustrated in FIG. 1;

in the return link, radiofrequency signals SP are sent over a link called an uplink LM2 to the multi-beam satellite 3 by the terrestrial terminals 6, as illustrated in FIG. 1. These radiofrequency signals SP are then processed at the multi-beam satellite 3, then re-transmitted over a link called a downlink LD2 to the main terrestrial station 2, as illustrated in FIG. 1.

It is recalled that a general frequency band for establishing radiofrequency links called the Ka-band associated with a coverage area for region 1 (Europe) is defined within the scope of a regulation drafted by the International Union of Telecommunications (IUT).

The following frequency distribution is provided in accordance with this Ka-band:

| Forward link | Uplink LM1 (from the terrestrial station) | Bandwidth: 27.5 GHz to 29.5 GHz |
|---|---|---|
| | Downlink LD1 (to the terrestrial terminals) | Bandwidth: 19.7 GHz to 20.2 GHz |
| Return link | Uplink LM2 (from the terrestrial terminals) | Bandwidth: 29.5 GHz to 30.0 GHz |
| | Downlink LD2 (to the terrestrial station) | Bandwidth: 17.7 GHz to 19.7 GHz |

This Ka-band will be considered in the description below as a non-limiting example.

It should be noted that a geographical coverage area such as Europe is formed of a plurality of cells C belonging to a single cell planning N, each cell C being represented schematically by a circle.

The payload 10 is described hereinafter with regard to the forward link.

Forward Link

Figure 2:
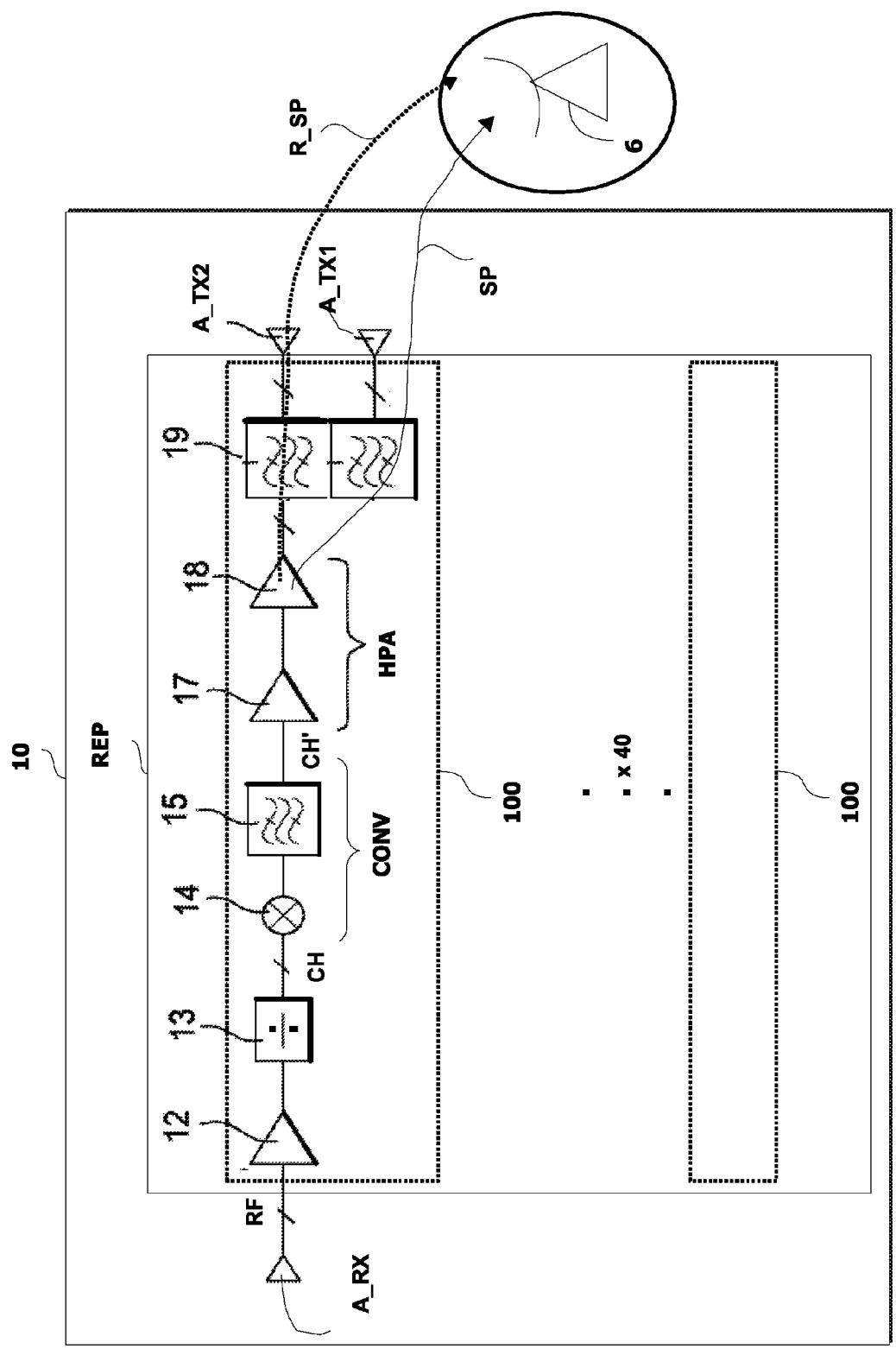
FIG. 2 is a functional block diagram of an architecture of a forward link payload according to a non-limiting embodiment of the invention.

A forward link payload 10 for a multi-beam satellite 3, a forward link allowing receipt of radiofrequency signals from at least one main terrestrial station 2 so as to re-transmit said signals to at least one terrestrial terminal 6, is described in a non-limiting embodiment in FIG. 2.

In particular, this forward link payload comprises:
- one or more reception antennas A_RX for receiving polarised radiofrequency signals;
- a regeneration device REP for regenerating radiofrequency signals RF by filtering, frequency transposition and amplification, the regeneration device comprising a plurality of regeneration chains 100, each chain comprising an amplification device CAMP-TWTA able to amplify two radiofrequency signals having different frequency bands; and
- transmission antennas A_TX1, A_TX2 for transmitting the regenerated radiofrequency signals SP to one or more terrestrial terminals 6, each signal SP being associated with a single basic coverage area, called a cell C, and the transmission antennas associated with an amplification chain 100 being able to transmit two regenerated radiofrequency signals SP having mutually orthogonal directions of polarisation and destined for cells belonging to a single cell planning N which uses at least two frequency bands F', F" and two different polarisations.

As will be seen hereinafter, the ability to manage two radiofrequency signals in a single regeneration chain 100 makes it possible to reduce the number of components used, without having multi-path effects caused by signal replicas thanks to the transmission of regenerated radiofrequency signals having orthogonal directions of polarisation.

The forward link payload 10 functions in the following manner.

In a first step 1), the reception antennas A_RX for receiving the payload 10 receive polarised radiofrequency signals RF. These signals RF are sent by one or more main terrestrial stations 2 over an uplink LM1. In the non-limiting example taken from FIG. 2 and throughout the rest of the description, only a single main station 2 will be considered.

In a first non-limiting embodiment, the polarisation is linear. In this case, the polarisation includes two directions: horizontal and vertical.

In a second non-limiting embodiment, the polarisation is circular. In this case, the polarisation includes two directions: left-hand circular and right-hand circular.

A circular polarisation will be considered by way of example in the rest of the description.

It should be noted that the radiofrequency signals RF are received by a method called frequency re-use. This method makes it possible to use the same frequency range a number of times in the same multi-beam satellite 3 so as to increase the overall capacity of the multi-beam satellite 3 without increasing the assigned bandwidth. In a non-limiting embodiment, a frequency re-use pattern called a colour pattern is used and frequency plans are determined using this pattern.

The uplink LM1 leaving the main terrestrial station 2 uses a given polarisation, in this case a circular polarisation, having two directions of polarisation.

Frequency channels CH are associated with a given polarisation and are distributed among the two directions of polarisation. In accordance with a four-colour pattern (red, yellow, blue, green), the signal transmissions being polarised in one of the two directions of polarisation (right-hand circular or left-hand circular), each colour is associated with a band of 250 MHz and a given direction of polarisation, and therefore with a given channel CH.

It should be noted that the use of a four-colour pattern is a non-limiting example, and that a pattern of any number of colours greater than three can be used. However, if it is desired to utilise isolation by polarisation (explained further below) to the best possible extent allowed by the use of two directions of polarisation, an even number of colours is used. A minimum of two frequencies is thus used for the single cell planning N.

The following is adopted throughout the rest of the description:
- the colour red is represented by lines hashed to the left;
- the colour green is represented by disperse dots;
- the colour blue is represented by lines hashed to the right;
- the colour yellow is represented by dense dots.

It should be noted that this type of pattern is just as applicable in uplink LM1 as in downlink LD1.

Also, in a non-limiting embodiment, in the downlink LD1 a colour is associated with each regenerated radiofrequency signal SP from the multi-beam satellite 3 (and thus to a cell C) in such a way that the regenerated radiofrequency signals of the same "colour" are not adjacent: The contiguous cells thus correspond to different colours. An example of a four-colour pattern for the coverage area of Europe is shown in FIG. 3. In the case of the Ka-band, 80 cells C are used to cover the area of Europe, said cells belonging to a single cell planning N, as illustrated in FIG. 3.

FIGS. 4 and 5 show a frequency plan using the colour pattern and broken down as follows:
- an uplink frequency plan PMVA over the forward link; and
- a downlink frequency plan PDVA over the forward link.

The notations RHC and LHC refer to the right-hand and left-hand circular directions of polarisation respectively.

In the example of the Ka-band, the PMVA plan corresponding to the uplink LM1 over the forward link (from the main terrestrial station to the multi-beam satellite 3) has 2 GHz (from 27.5 to 29.5 GHz) of available frequency spectrum.

There are thus 16 channels CH for a given polarisation, that is to say 8 channels CH for each given direction of polarisation, and 2 channels distributed over the same frequency band of 250 MHz. In the example of FIG. 4, the channels CH1 to CH8 have the first direction of polarisation (left-hand circular LHC for example) and the channels CH9 to CH16 have the second direction of polarisation (right-hand circular RHC). The use of polarised signals makes it possible to reduce the total number of main terrestrial stations 2 because double the number of signals is sent via one main terrestrial station.

The main terrestrial station 2 thus distributes the radiofrequency signals RF over 16 channels of 250 MHz bandwidth (8 channels for each direction of polarisation). These radiofrequency signals RF distributed over these 16 channels after regeneration by the payload 10 of the multi-beam satellite 3 will be distributed over 4 downlink channels, as will be seen hereinafter.

It should be noted that it has been assumed that the entire spectrum of 2 GHz is used. However, it should be noted that it is also possible, in other embodiments and in particular for operational reasons, for only part of the spectrum to be used and for fewer channels CH to be generated.

Thus, for the forward link, a radiofrequency signal RF sent by the main terrestrial station 2 is associated with one of the four following colours:
- a red colour corresponding to a first band of 250 MHz and to the left-hand circular direction of polarisation;
- a yellow colour corresponding to the same first band of 250 MHz and to the right-hand circular direction of polarisation;
- a blue colour corresponding to a second band of 250 MHz and to the right-hand circular direction of polarisation
- a green colour corresponding to the same second band of 250 MHz and to the left-hand circular direction of polarisation.

Four adjacent channels CH of the same pattern are each associated with a different colour.

Thus, "different colour" means the fact of having a different polarisation and/or a different frequency.

Thus, for two different colours it is possible to have:
either the same frequency band and different polarisation;
or a different frequency band and:
either different polarisation; or
same polarisation.

Thus, the cell planning described N is a network of cells in which a cell is surrounded by a maximum of six cells using different frequency bands and/or different polarisations.

In the non-limiting example above, the reception antennas A_RX for receiving the payload 10 thus receive radiofrequency signals RF distributed over the 16 channels CH.

As will be seen hereinafter, the radiofrequency signals RF multiplexed over the channels CH are then regenerated at the payload 10 of the multi-beam satellite 3, each of these regenerated signals SP being distributed over downlink channels CH' associated with a direction of polarisation RHC or LHC and with frequency bands in accordance with the downlink frequency plan PDVA.

In a second step 2), the regeneration device REP regenerates the radiofrequency signals RF by filtering, frequency transposition and amplification, as will be seen hereinafter.

The regeneration device REP is called a repeater and, in a non-limiting embodiment as illustrated in FIG. 2, comprises a plurality of regeneration chains 100, each chain 100 comprising an amplification device CAMP-TWTA able to amplify two radiofrequency signals RF having different frequency bands.

In a non-limiting embodiment adopted throughout the rest of the description, the antennas A_RX of a single regeneration chain 100 receive the radiofrequency signals RF destined for two cells C. One regeneration chain 100 will thus process two radiofrequency signals RF. There are thus 40 regeneration chains 100 in the repeater REP.

In a non-limiting embodiment, a regeneration chain 100 comprises:
- one low noise amplifier 12 (LNA) for amplifying the two radiofrequency signals RF as a function of the noise generated by the components of the regeneration chain 100;
- one signal divider device 13 (demultiplexer) for separating the two radiofrequency signals RF which are distributed channels CH of the uplink PMVA;
- one frequency converter circuit CONV formed:
  - by a local oscillator 14 for frequency translating the radiofrequency signals and for adjusting them over two of the four channels CH' in accordance with the frequency plan of the downlink PDVA. In the case of the Ka-band, each of the four channels CH' is associated with a frequency band from the two frequency bands [19.7; 19.95] and [19.95; 20.2] and with a polarisation RHC or LHC, as shown in the downlink frequency plan PDVA for the forward link in FIG. 5; and
  - by an input filter 15 for filtering the part of the signal useful for amplification in the radiofrequency signals.
- one amplification device which is a high power amplifier (HPA) formed, in a non-limiting embodiment, by a channel amplifier 17 (CAMP) and a travelling wave tube amplifier for amplifying the radiofrequency signals; and
- two output bandpass filters 19 (also called output demultiplexers) for filtering the regenerated radiofrequency signals SP as a function of their destination cell and thus as a function of the transmission antennas A_TX1, A_TX2 associated with these cells.

At the output of a regeneration chain 100, regenerated radiofrequency signals SP will thus be distributed over two downlink frequency channels CH' (also called output channels).

Thus, at the output of a repeater REP, regenerated radiofrequency signals SP will thus be distributed over four downlink frequency channels CH'1 to CH'4.

In a non-limiting embodiment, the following frequencies are assigned to the output channels CH', as illustrated in FIG. 5:
- a first frequency F' between 19.7 GHz and 19.95 GHz for the first output channel CH'1 and the third output channel CH'3'
- a second frequency F" between 19.95 GHz and 20.2 GHz for the second output channel CH'2 and the fourth output channel CH'4.

The cell planning N thus uses at least two frequency bands F', F" and two different polarisations.

The use of one regeneration chain 100 to amplify a plurality of radiofrequency signals RF thus makes it possible to reduce the number of components used in the payload 10.

In addition, the two radiofrequency signals RF amplified by an amplification device HPA of a regeneration chain 100 have different frequency bands. This makes it possible to differentiate between them in the regeneration chain 100 and more specifically in the converter CONV and the demultiplexers 19.

It should be noted that the regeneration of a plurality of radiofrequency signals in a single regeneration chain 100 and thus the use of at least two demultiplexers 19 and antennas A_TX associated with each demultiplexer 19 may lead to multi-path effects caused by a replica of a radiofrequency signal R_SP. Such a replica is created just after the high-power amplifier HPA. In fact, since the filters 19 and transmission antennas A_TX are not perfect, part of the regenerated radiofrequency signal SP destined for a given cell C is filtered by the wrong filter 19 and is sent to said cell C by the wrong antenna A_TX, which results in the creation of the replica of a signal R_SP.

Thus, as illustrated in FIG. 2, a first filter 19 makes it possible to filter a first radiofrequency signal SP destined for a first given cell, whereas a second filter 19 of the same regeneration chain 100 makes it possible to filter a second radiofrequency signal (not shown) destined for a second given cell. This second filter 19 will also filter the replica R_SP of the first filtered signal. Depending on the attenuation of this second filter, the first cell C may or may not receive the replica of the signal R_SP as interference.

Moreover, as illustrated in FIG. 2, a first antenna A_TX1 will radiate the first regenerated radiofrequency signal SP destined for a first specific cell C, and a second antenna A_TX2 will radiate the replica of the signal S_RP towards the same cell C. This leads to poor reception of the first regenerated radiofrequency signal SP by the first cell C to which it is destined and therefore by the terrestrial terminals 6 of this cell C. In fact, a terrestrial terminal 6 will receive, in combination, the regenerated radiofrequency signal SP via the first antenna A_TX1, this signal being destined for said terminal, but also the replica R_SP of this signal via the second antenna A_TX2.

The replica R_SP of a signal will thus produce multi-path effects which will be attenuated as a function of the filters 19 used in a regeneration chain 100, but also as a function of the radiation of the antennas A_TX1, A_TX2 used and associated with a single regeneration chain 100.

It should be noted that the combination of the replica of the signal with the radiofrequency signal itself introduces an undulation PPR, called a ripple, into the power of the regenerated radiofrequency signal SP destined for a terrestrial terminal 6. The greater the amplitude of this undulation, called the peak-to-peak ripple, the more significant the multi-path effects caused by a signal replica.

As will be seen hereinafter, the multi-path effects are reduced by influencing in particular a spatial component of the radiofrequency signal SP received by a terrestrial terminal 6.

The form of the radiofrequency signal SP received by a terrestrial terminal 6 is represented as follows:

$$S_r(t,F,x) = \beta(x) S_t(t)(1 + \alpha_F(F) \cdot \alpha_A(x)) \quad [1]$$

where:
- $S_r(t, F, x)$ is the radiofrequency signal SP received by the terrestrial terminal 6 at a frequency F and when the terminal 6 is located in a position x in the coverage area of the Ka-band;
- $S_t(t)$ is the radiofrequency signal RF received by the multi-beam satellite 3;
- $\beta(x)$ is the losses over the radiofrequency signal RF caused by the multi-beam satellite 3 and by the propagation of the signal towards the terrestrial terminal 6;
- $\alpha_F(F)$ is a frequential parameter, also called the frequential component, representative of the attenuation caused by the filters 19 of a regeneration chain 100 of the payload 10;
- $\alpha_A(x)$ is a spatial parameter which is also called the spatial component and is representative of spatial isolation of the terminal 6 in position x in the coverage area of the Ka-band.

It should be noted that the product of the frequential and spatial components $\alpha_F(F)$ and $\alpha_A(x)$ is representative of a signal replica, the signal received by a terrestrial terminal 6 not being pure due to the fact that the filters 19 of the payload 10 and the transmission antennas A_RX are not perfect, as explained above.

It should also be noted that the smaller the frequential component $\alpha_F(F)$, the greater the rejection of the filters 19. Likewise, the smaller the spatial component $\alpha_A(x)$, the greater the rejection caused by the transmission antennas A_TX. The overall rejection will thus vary as a function of the spatial component $\alpha_A(x)$ and also as a function of the frequential component $\alpha_F(F)$.

By influencing only one of the two components, it is possible to increase overall rejection and thus minimise the multi-path effects caused by a signal replica. In fact, by influencing the spatial component $\alpha_A(x)$, the overall rejection can be increased for example, since the smaller the spatial component $\alpha_A(x)$, the smaller the product of the components $\alpha_F(F)$ and $\alpha_A(x)$.

As will be seen hereinafter isolation by polarisation is carried out so as to reduce the spatial component $\alpha_A(x)$, and, in a non-limiting embodiment, external spatial isolation is carried out, which increases overall rejection and thus reduces the multi-path effects and therefore the ripple PPR in the power of the regenerated radiofrequency signal SP.

In a third step 3), the transmission antennas A_TX1, A_TX2 transmit the regenerated radiofrequency signals SP to one or more terrestrial terminals 6, each regenerated radiofrequency signal SP being associated with a single basic coverage area, called a cell C.

Isolation by Polarisation

So as to reduce the spatial component $\alpha_A(x)$, the transmission antennas A_TX1, A_TX2 associated with a regeneration chain 100 are able to transmit two regenerated radiofrequency signals SP having orthogonal directions of polarisation.

Thus, the two radiofrequency signals RF having mutually orthogonal directions of polarisation are destined for two cells which are paired as follows:
- a green cell (left-hand circular polarisation) and a yellow cell (right-hand circular polarisation); or
- a red cell (left-hand circular polarisation) and a blue cell (right-hand circular polarisation).

With reference to FIG. 6, which illustrates part of the coverage area of the Ka-band of FIG. 2, in this case for example the antennas A_TX1 and A_TX2 of the same regeneration chain 100 will be able to radiate respectively:
- a radiofrequency signal SP33 destined for a cell C33 (green cell) and a radiofrequency signal SP23 destined for the adjacent cell C23 (yellow cell) and/or
- a radiofrequency signal SP33 destined for a cell C33 (green cell) and a radiofrequency signal SP42 destined for the adjacent cell C42 (yellow cell).

In this way, the antennas A_TX1 and A_TX2 will be able to radiate, respectively, these radiofrequency signals SP33 and SP23 or SP33 and SP42 having mutually orthogonal directions of polarisation and destined for the cells C33 and C23 or C33 and C42 respectively, said cells belonging to the same cell planning N, as illustrated in FIG. 6.

Likewise, for example, the antennas A_TX1 and A_TX2 of the same regeneration chain 100 will be able to radiate, respectively:
- a radiofrequency signal SP34 destined for a cell C34 (red cell) and a radiofrequency signal SP24 of the adjacent cell C24 (blue cell) and/or
- a radiofrequency signal SP34 destined for a cell c34 (red cell) and a radiofrequency signal SP43 of the adjacent cell C43 (blue cell).

In this way, the antennas A_TX1 and A_TX2 will be able to radiate, respectively, these radiofrequency signals SP34 and SP24 or SP34 and SP43 having mutually orthogonal directions of polarisation and destined for cells C34 and C24 or C34 and C43 respectively, said cells belonging to the same cell planning N, as illustrated in FIG. 6.

A terrestrial terminal 6 positioned in a green cell for example will thus receive:

a first regenerated radiofrequency signal SP1 destined for said green cell which will be in the left-hand circular direction of polarisation.

a signal replica R_SP1 which will be in the right-hand circular direction of polarisation.

The multi-path effects, will be reduced thanks to the discrimination by polarisation of the terminal 6. In a non limiting example, the effects will be reduced by approximately 20 dB.

Figure 7:
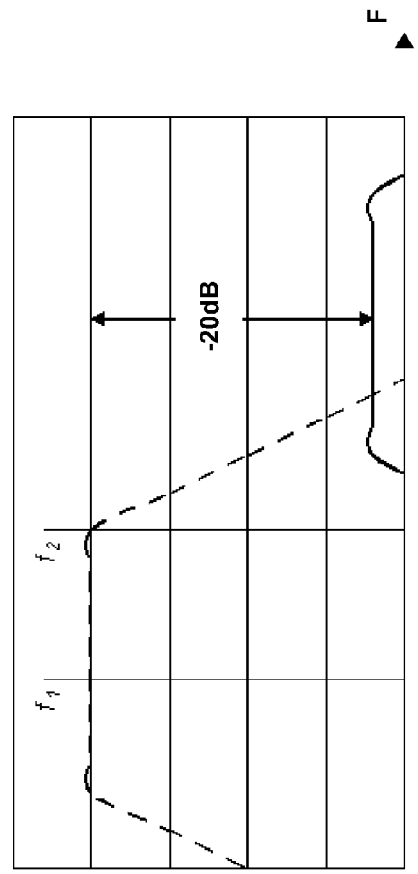
FIG. 7 shows an attenuation curve of filters included in a regeneration chain of the payload of FIG. 2 in the case where radiofrequency signals are transmitted by the antennas of the payload with orthogonal directions of polarisation.

The regenerated radiofrequency signal SP received by the terrestrial terminal 6 destined for the cell C in which the terminal 6 is located will be filtered by a first filter 19, of which the attenuation curve is shown in FIG. 7 (by a dashed line), and the replica R_SP of this signal will be filtered by a second filter 19, of which the attenuation curve (solid line) will be reduced by 20 dB as a result of the discrimination by polarisation and the orthogonal directions of polarisation. The signal replica R_SP therefore will not generate too much interference on the regenerated radiofrequency signal SP received by the terminal 6.

Isolation by polarisation of the radiofrequency signal SP destined for the cell C in which the terrestrial terminal 6 is located is thus obtained.

It should be noted that, in practice, the transmission antennas A_TX are assembled at the factory site, wherein an input of the antennas is configured so that they transmit in the desired direction of polarisation and they are assembled together and associated with the different regeneration chains 100 in such a way that the transmission antennas A_TX associated with the same regeneration chain 100 transmit two radiofrequency signals having orthogonal directions of polarisation and therefore radiate to two different cells.

Isolation by Polarisation and External Spatial Isolation by Non-Adjacent Cells

In a non-limiting embodiment, the transmission antennas A_TX associated with a regeneration chain 100 are able to transmit two regenerated radiofrequency signals SP by said amplification device 100 to two non-contiguous cells C.

Two regenerated radiofrequency signals SP regenerated by the same regeneration chain 100 are thus radiated to two cells which are not adjacent but which are paired as follows:

a green cell (left-hand circular polarisation) and a non-adjacent yellow cell (right-hand circular polarisation); or a red cell (left-hand circular polarisation) and a non-adjacent blue cell (right-hand circular polarisation).

In this case for example, the transmission antennas A_TX of the same regeneration chain 100 which are able to radiate a regenerated radiofrequency signal SP33 destined for a cell C33 (green cell) for example can also be used to radiate a regenerated radiofrequency signal of the non-adjacent cell C21 (yellow cell) or of the adjacent cell C25 (yellow cell).

The cells C33 and C21 have an edge-to-edge distance Dc measuring half a diameter $\theta_c$ of a cell (case a)).

The cells C33 and C25 have an edge-to-edge distance Dc measuring 1.3 times the diameter $\theta_c$ of a cell (case b)).

The radiation of an antenna in the direction of a cell includes a main lobe Lb0, Lb0', Lb0", a primary lobe Lb1, Lb1', Lb1", and a secondary lobe Lb2, Lb2', Lb2".

Likewise; for example the transmission antennas A_TX of the same regeneration chain 100 which are able to radiate a regenerated radiofrequency signal SP34 destined for a cell C34 (red cell) for example can also be used to radiate a regenerated radiofrequency signal of the non-adjacent cell C45 (blue cell) or of the non-adjacent cell C41 (blue cell).

The cells C34 and C45 have an edge-to-edge distance Dc measuring half a diameter $\theta_c$ of a cell (case a)).

The cells C34 and C41 have an edge-to-edge distance Dc measuring 1.3 times the diameter $\theta_c$ of a cell (case b)).

The cells are thus isolated spatially from one another.

Case a) C33 and C21

In the case of external spatial isolation of a half-dell (Dc=0.5), a terrestrial terminal 6 positioned in a green cell, cell C33 for example, will receive:

a first regenerated radiofrequency signal SP33 (dashed line) destined for said green cell; and a signal replica R_SP33 filtered by the primary lobe Lb1' (solid line) of the radiation of the antenna which transmits in the direction of the non-adjacent yellow cell C21.

The replica of the signal R_SP33 will be filtered by this primary lobe Lb1' instead of by the main lobe Lb0'. Filtering (rejection of the filter) is thus more substantial and therefore the replica of the signal received by the terminal 6 for which the regenerated radiofrequency signal SP33 is destined will be weaker.

Thus, in the case of external spatial isolation of half cell diameter, if the terminal 6 is located next to the cell and is at a border frequency F2 (described further below) of a channel CH', the reduction in the multi-path effects will be −13 dB compared to a situation without external spatial isolation. The spatial component $\alpha_A(x) \ll 1$ is obtained.

An overall reduction of 33 dB is thus obtained in combination with isolation by polarisation.

Case b) C33 and C25

In the case of external spatial isolation of 1.3 times cell diameter (Dc=1.3), a terrestrial terminal 6 positioned in a green cell, cell C33 for example, will receive:

a first regenerated radiofrequency signal SP33 destined for said green cell; and a signal replica R_SP33 filtered by a secondary lobe Lb2' of the radiation of the antenna which transmits in the direction of the non-adjacent yellow cell C25.

The replica of the signal R_SP33 will be filtered by this secondary lobe Lb2' instead of by the main lobe Lb0' or the primary lobe Lb1'. Filtering (rejection of the filter) is thus more substantial and therefore the replica of the signal received by the terminal 6 for which the regenerated radiofrequency signal SP33 is destined will be weaker.

Thus, in the case of external spatial isolation of cell diameter Dc=1.3, if the terrestrial terminal 6 is located next to the cell and is at a border frequency F2 (described further below) of a channel CH', the reduction in the multi-path effects will be −20 dB compared to a situation with no external spatial isolation. The spatial component $\alpha_A(x) \ll 1$ is obtained.

An overall reduction of 40 dB is thus obtained in combination with isolation by polarisation.

Thus, thanks to isolation by polarisation of the regenerated radiofrequency signals SP and additional external spatial isolation, the spatial component $\alpha_A(x)$ of the signal received by a terrestrial terminal 6 is reduced, thus increasing overall rejection.

It is thus irrelevant that the frequential component $\alpha_F(F)$ might be large. It is thus irrelevant that a terrestrial terminal 6 uses a channel border frequency (described further below). It will not be too disturbed by a signal replica since this replica will be well filtered.

It should be noted that, in each case, the amplification device HPA of the same regeneration chain 100 makes it possible to reduce intrinsically the rate of rejection by 20 dB.

It should be noted that, in practice, for isolation by polarisation and external spatial isolation, the transmission antennas A_TX, are assembled at the factory site, wherein an input of the antennas is configured so that they transmit in the desired direction of polarisation and they are assembled together and associated with the different regeneration chains 100 in such a way that the transmission antennas A_TX associated with the same regeneration chain 100 transmit two radiofrequency signals having orthogonal directions of polarisation to two different non-contiguous cells.

It should be noted that the multi-path effects can also be reduced by:
1) internal spatial isolation if a terrestrial terminal 6 is far from a cell edge, and
2) frequential isolation if a terrestrial terminal 6 receives a regenerated radiofrequency signal SP which uses a middle frequency of the channel CH'.

As will be seen hereinafter, applied to isolation by polarisation and to external spatial isolation, this reduces the multi-path effects even further.

Internal Spatial Isolation

Figures 8, 9:
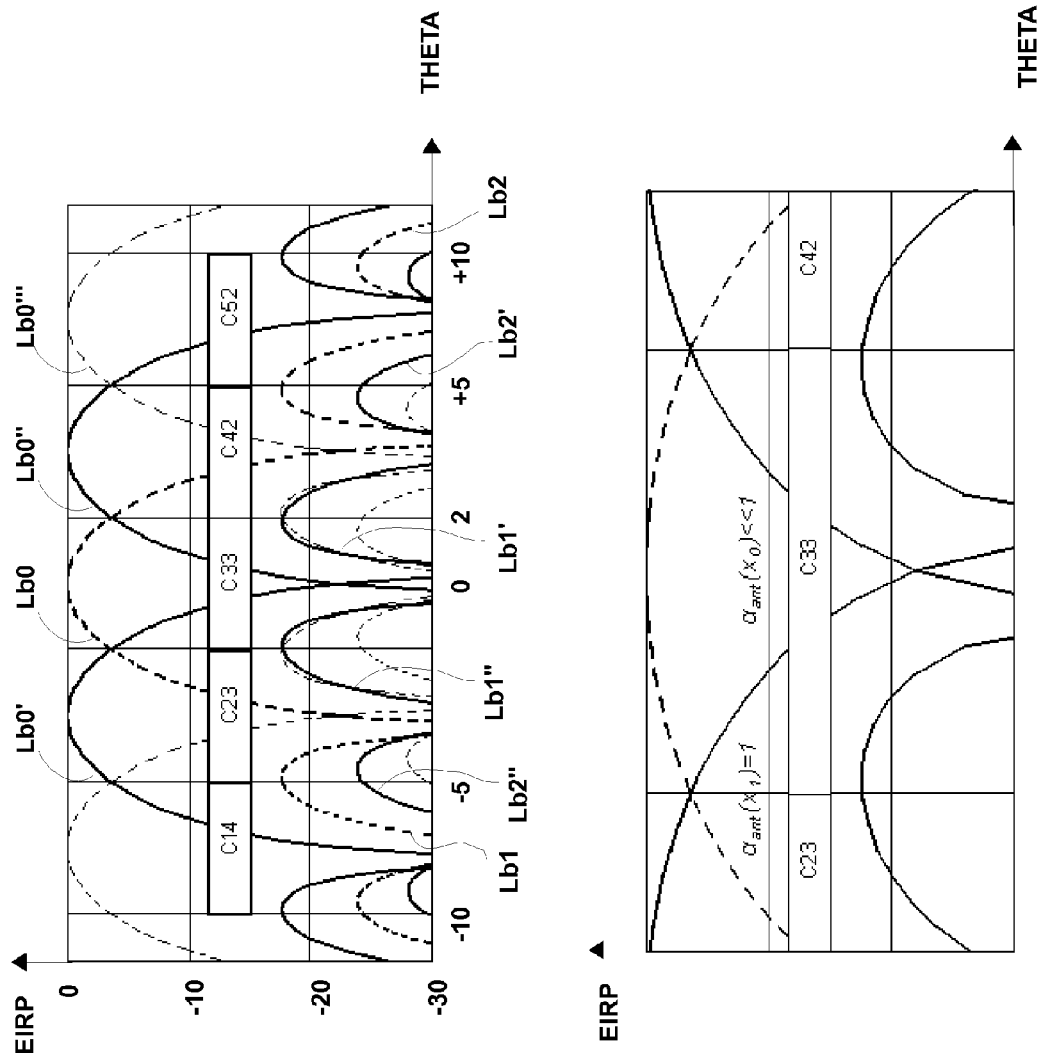
FIG. 8 shows a schematic diagram of radiation of antennas of the payload of FIG. 2 in the direction of a terrestrial terminal which would be displaced along an axis of displacement of FIG. 6 when the terminal does not exhibit polarisation discrimination.
FIG. 9 is an enlarged view of part of FIG. 8.
Figures 10, 11:
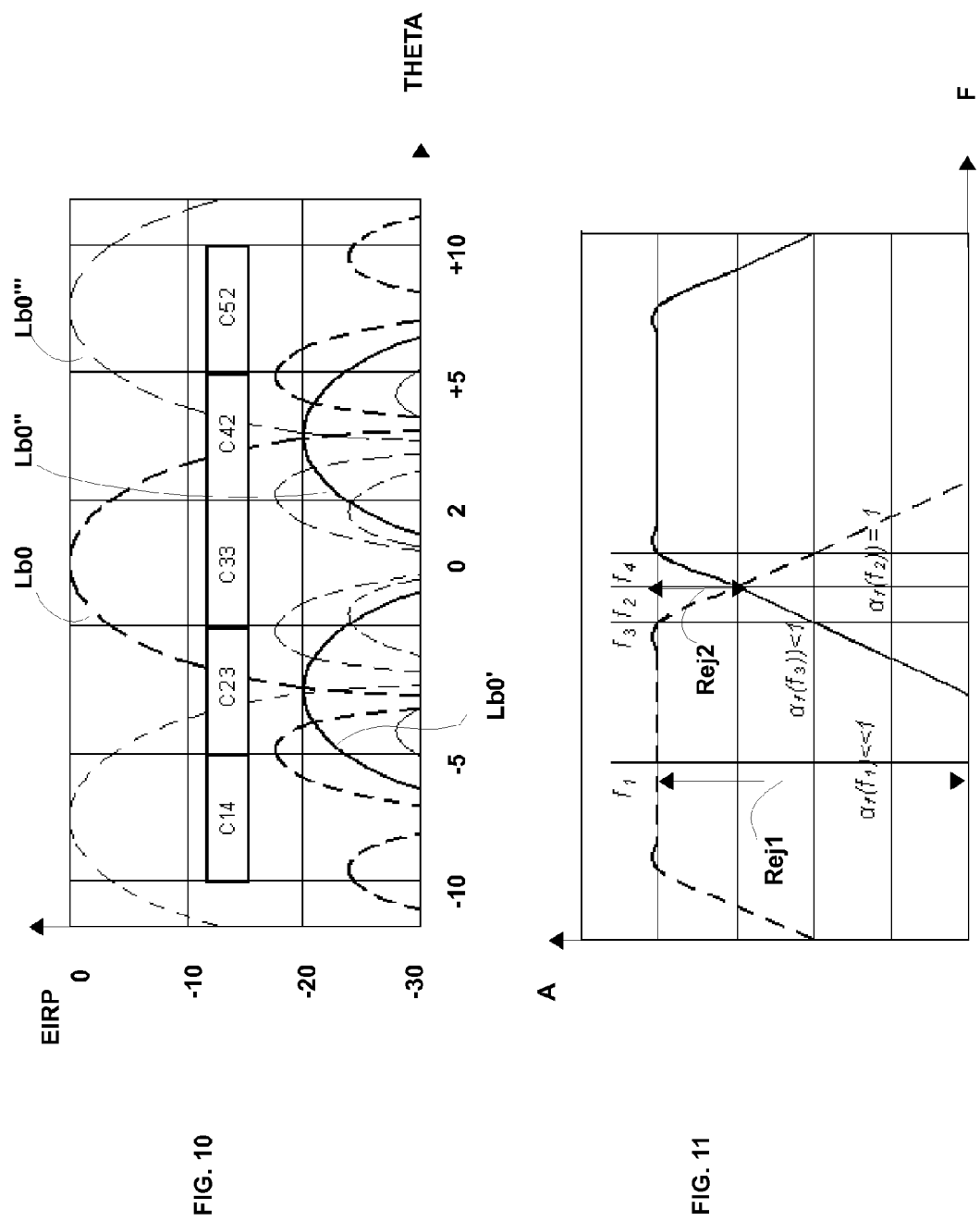
FIG. 10 shows a schematic diagram of radiation of antennas of the payload of FIG. 2 in the direction of a terrestrial terminal which would be displaced along an axis of displacement of FIG. 6 when the terminal exhibits polarisation discrimination.
FIG. 11 shows an attenuation curve of filters included in a regeneration chain of a payload of the prior art.

FIGS. 8, 9 and 10 illustrate the radiation of the antennas of the same regeneration chain 100, said antennas radiating regenerated signals SP in the direction of two cells and the regenerated radiofrequency signals SP having different frequency bands and orthogonal directions of polarisation, for example in the direction of a green cell and in the direction of a yellow cell.

On the abscissa, THETA represents the position of an imaginary observer, which would move along cells C located over the path of a section CC' of FIG. 6, FIG. 6 showing part of the frequency plan of cells C assigned to the Ka-band.

On the ordinate, EIRP represents the radiation of an antenna which is representative of the power of a regenerated radiofrequency signal SP received by a cell C, called the effective isotropically radiated power or equivalent isotropically radiated power (EIRP).

It should be noted that, as illustrated in FIGS. 8, 9 and 10, the radiation of an antenna in the direction of a cell includes a main lobe Lb0, Lb0', Lb0", a primary lobe Lb1, Lb1', Lb1", and a secondary lobe Lb2, Lb2', Lb2".

As can be seen in FIG. 6, the cells C14, C23, C33, C42 and C52 are arranged along the section CC'.

The green cells are the cells C14, C33 and C52 and the radiation of the respective associated antennas are shown by dots in FIGS. 8, 9 and 10.

The yellow cells are the cells C23 and C42 and the radiation of the respective associated antennas are represented by solid lines in FIGS. 8, 9 and 10.

When a terrestrial terminal 6 which is not sensitive to the direction of polarisation of a regenerated radiofrequency signal SP (it does not discriminate by polarisation) is located at the edge of a cell, for example next to the cell C33 (position THETA=2 approximately), it can be seen that it will receive the regenerated radiofrequency signal SP33 associated with cell C33 as well as its replica R_SP33 with the same power of approximately −3 dB, the latter being filtered by the main lobe Lb0' (solid lines) of the antenna associated with cell C23. The multi-path effect is thus significant. The terrestrial terminal 6 will be disturbed by said signal replica R_SP33. The spatial component $\alpha_A(x) \approx 1$ of the signal received by the terrestrial terminal 6 is thus obtained, as illustrated in FIG. 9, which is an enlarged view of part of FIG. 8.

By contrast, when a terrestrial terminal 6 is located in the middle of a cell, for example in the middle of cell C33 (position THETA=0), it can be seen that it will receive the regenerated radiofrequency signal SP33 with a maximum power of 0 dB and the signal replica R_SP33 with a power of approximately −20 dB, the latter being filtered by the first lobe Lb1' (solid lines) of the antenna associated with cell C23. The multi-path effect is thus negligible. The spatial component $\alpha_A(x) \ll 1$ of the signal received by the terrestrial terminal 6 is thus obtained, as illustrated in FIG. 9, which is an enlarged view of part of FIG. 8.

FIG. 10 applies to the same arrangement of cells as in FIG. 8, but when a terrestrial terminal 6 is sensitive to the direction of polarisation of a regenerated radiofrequency signal SP.

In this case, when a terrestrial terminal 6 is located at the edge of a cell C, for example next to the cell 33 (position THETA=2 approximately), it can be seen that it will receive the regenerated radiofrequency signal SP33 associated with cell C33 with a power of approximately −3 dB and its replica R_SP33 with a lower power of approximately −17 dB, the latter being filtered by the main lobe Lb0' (solid lines) of the antenna associated with cell C23. The multi-path effect produced is thus less significant than when the terminal 6 does not discriminate by polarisation.

By contrast, when a terrestrial terminal 6 is located in the middle of a cell C, for example in the middle of cell C33 (position THETA=0), it can be seen that it will receive the regenerated radiofrequency signal SP33 with a maximum power of 0 dB and it will not receive its replica R_SP33. The multi-path effect produced is thus non-existent in this case.

Frequential Isolation

So as to explain internal frequential isolation, the prior art situation in which there are no orthogonal directions of polarisation for the regenerated radiofrequency signals SP transmitted by transmission antennas of the same regeneration chain 100 will be considered.

In FIG. 11, in a non-limiting example, the dashed curve represents the attenuation curve of a first filter 19 of a regeneration chain 100 for filtering the regenerated radiofrequency signals SP destined for a green cell when a terminal 6 located in a green cell, whereas the solid curve represents the attenuation curve of the second filter 19 of the same regeneration chain 100 for filtering the radiofrequency signals destined for a non-adjacent red cell, the replica of a signal R_SP destined for the green cell thus passing through this filter.

As can be seen, if a terrestrial terminal 6 uses a middle frequency F1 located in the middle of the frequency band of an associated downlink channel CH', the rejection Rej1 of the filter 19 will be high and the frequential component $\alpha_F(F)$ of the signal received will therefore by very low. The terrestrial terminal 6 will not be disturbed by the replica of the signal R_SP.

$\alpha_F(F1) \ll 1$ is thus obtained. The frequency F1 used is far from the limits of the frequency band of the downlink channel CH' used and is thus far from any other adjacent frequency band.

By contrast, the situation is very different if a terrestrial terminal 6 uses a border frequency F2 which is located at the edge of the frequency band of an associated downlink channel CH' and therefore close to the frequency band of a channel CH' associated with an adjacent cell.

In FIG. 11, this frequency is located on the descending slope of the attenuation curve of the filter 19. In this case, the rejection Rej2 of the filter 19 will thus be low and the frequential component $\alpha_F(F)$ of the received signal will thus be high. The terrestrial terminal 6 will be disturbed by the replica of the signal R_SP. $\alpha_F(F2) \approx 1$ is thus obtained. The frequency F2 used is close to the limits of the frequency band of the downlink channel CH' used and is therefore close to any other adjacent frequency band.

It should be noted that the second border frequency F2 defines a guard band for the green cell with a third frequency F3 illustrated in FIG. 11, the latter frequency being located next to the attenuation curve of the first filter 19 (represented by a dashed line).

It should be noted that, in a known earlier prior art, this guard band is generally defined in such a way that the radiofrequency signal destined for the red cell is sufficiently filtered so as not to disturb the radiofrequency signal destined for the green cell, and the replica of the signal is therefore sufficiently filtered. The guard band is therefore quite large. For example, the third frequency F3 is located between 10 and 20 MHz below the second frequency F2. Likewise, as is known from the prior art, a guard band with a fourth frequency F4 is defined for the red cell. The fourth frequency F4 is located between 10 and 20 MHz above the second frequency F2 and next to the attenuation curve of the second filter 19 (represented by a solid line).

Thus, in a non-limiting example, if the frequency band of the channel is from 19.7 to 19.95 GHz, F1 would be located between 19.7 GHz and 19.95 GHz less the guard band of 20 MHz for example (therefore where the rejection of the filter is significant, that is to say 20 dB), whereas the border frequency F2 would be located at 19.95 GHz (that is to say in the middle of the overall bandwidth from 19.7 to 20.2 GHz).

Internal Spatial Isolation and Frequential Isolation Applied to Isolation by Polarisation Applied to isolation by polarisation, the following results are thus obtained:
1) internal spatial isolation due to the fact that the terrestrial terminal 6 is positioned far from a border of the cell C: This isolation will thus be approximately 20 dB, leading to a total reduction of 40 dB;
2) frequential isolation due to the fact that a middle frequency F1 of a downlink channel CH' is used: This isolation will thus be approximately 20 dB, leading to a total reduction of 40 dB without internal spatial isolation 1) or 60 dB with internal spatial isolation 1).

The multi-path effects on the ripple produced over the regenerated radiofrequency signal SP are shown in FIG. 12, where the amplitude PPR of the ripple is plotted on the abscissa and the overall rejection REJ, which represents the regrouped effect of the frequential $\alpha_F(F)$ and spatial $\alpha_A(x)$ components, as seen before, is plotted on the ordinate.

As can be seen, in the case with isolation by polarisation at the edge of a cell and at a border frequency F2, the amplitude of the ripple PPR is 1.7 dB, as indicated at point PT1 in FIG. 12.

In the case of additional internal spatial isolation 1), in the centre of the cell, the amplitude of the ripple decreases to 0.2 dB, as indicated at point PT2 in FIG. 12.

In the case of additional frequential isolation 2), with use of a middle frequency F1, the amplitude of the ripple decreases to 0.02 dB and thus becomes negligible.

Internal Spatial Isolation and Frequential Isolation Applied to External Spatial Isolation Case a): External Spatial Isolation of a Half-Cell (Dc=0.5).

Applied to spatial isolation of a half-cell, the following results are thus obtained:
1) internal spatial isolation if the terrestrial terminal 6 is positioned far from a border of the cell C: This isolation will thus be approximately 20 dB, leading to a total reduction of 53 dB;
2) additional frequential isolation if a middle frequency F1 of a channel CH' is used: This isolation will thus be approximately 20 dB, leading to a total reduction of 53 dB without internal spatial isolation 1) or 73 dB with internal spatial isolation 1).

In the case with external spatial isolation of diameter Dc=0.5, at the edge of a cell and at a border frequency F2, the amplitude of the ripple is 0.4 dB and is located at the point PT2 in FIG. 12.

In the case of an addition of internal spatial isolation 1), in the centre of the cell, the amplitude of the ripple decreases to 0.04 dB and is located approximately at point PT3 in FIG. 12.

In the case of an addition of additional frequential isolation 2), with use of a middle frequency F1, the amplitude of the ripple cannot be measured using conventional measuring instruments.

Case b): In the Case of External Spatial Isolation of Diameter Dc=1.3)

Applied to spatial isolation of a cell diameter of 1.3, the following results are thus obtained:
1) internal spatial isolation if the terrestrial terminal 6 is positioned far from a border of the cell C: This isolation will thus be approximately 20 dB, leading to a total reduction of 60 dB; and/or
2) additional frequential isolation if a middle frequency F1 of a channel CH' is used: This isolation will thus be approximately 20 dB, leading to a total reduction of 60 dB without internal spatial isolation 1) or 80 dB with internal spatial isolation 1).

In the case with external spatial isolation of diameter Dc=1.3, at the edge of a cell and at a border frequency F2, the amplitude of the ripple is 0.2 dB and is located at the point PT2 in FIG. 12.

In the case of an addition of internal spatial isolation 1), in the centre of the cell, the amplitude of the ripple decreases to 0.02 dB and is located approximately at point PT2 in FIG. 12.

In the case of an addition of additional frequential isolation 2), with use of a middle frequency F1, the amplitude of the ripple cannot be measured using conventional measuring instruments.

Table 1, below, summarises the situations described above when a terrestrial terminal 6 is located next to a cell C.

| Frequency | Isolation by polarisation only | | Isolation by polarisation + external spatial isolation Dc = 1.3 | |
|---|---|---|---|---|
| | Suppression of multi-path effects | PPR | Suppression of multi-path effects | PPR |
| F1 | 40 dB | 0.2 dB | 60 dB | 0.02 dB |
| F2 | 20 dB | 1.7 dB | 40 dB | 0.2 dB |

| | Isolation by polarisation + external spatial isolation Dc = 0.5 | |
|---|---|---|
| Frequency | Suppression of multi-path effects | PPR |
| F1 | 53 dB | 0.04 dB |
| F2 with | 33 dB | 0.4 dB |

| Frequency | Amplification device Rejection | Internal spatial isolation | Isolation by polarisation |
|---|---|---|---|
| F1 | 20 dB | 0 dB | 20 dB |
| F2 | 0 dB | 0 dB | 20 dB |

Table 2, below, summarises the situations described above when a terrestrial terminal 6 is located far from the edge of a cell C—in the middle in a non-limiting example.

| | Isolation by polarisation | | Isolation by polarisation + external spatial isolation Dc = 1.3 | |
|---|---|---|---|---|
| Frequency | Suppression of multi-path effects | PPR | Suppression of multi-path effects | PPR |
| F1 | 60 dB | 0.02 dB | 80 dB | 0.002 dB |
| F2 | 40 dB | 0.22 dB | 60 dB | 0.02 dB |

| | Isolation by polarisation + external spatial isolation Dc = 0.5 | |
|---|---|---|
| Frequency | Suppression of multi-path effects | PPR |
| F1 | 73 dB | Immeasurable dB |
| F2 with | 53 dB | 0.04 dB |

| Frequency | Amplification device Rejection | Internal spatial isolation | Isolation by polarisation |
|---|---|---|---|
| F1 | 20 dB | 20 dB | 20 dB |
| F2 | 0 dB | 20 dB | 20 dB |

Thus, in the forward link, not only has the number of components used been reduced, but the multi-path effects (signal replica) generated by the regenerated radiofrequency signals have also been reduced.

Of course, the invention is not limited to the embodiments described above.

The invention has thus been described more specifically in the case of an amplifier formed by a CAMP followed by a TWTA. However, it should be noted that, in non-limiting examples, the invention can also be applied to the case of an amplifier of the SSPA type (solid state power amplifier) or to more sophisticated architectures of the MPA type (multipoint amplifier).

In addition, the example of circular polarisation has been considered as a non-limiting example. Of course, the invention can also be applied to other types of polarisation, for example linear or elliptical polarisation.

Moreover, the example of the Ka-band has been considered as a non-limiting example. Of course, the invention can be applied to other bands representing areas other than Europe.

In addition, the downlink bandwidth in the forward link between 19.7 GHz and 20.2 GHz has been considered as a non-limiting example, since users do not require a license in this bandwidth. Of course, other bandwidth ranges can be used. It will be noted that, in general, a user will be assigned his transmission and reception frequencies by a satellite telecommunications network operations centre in accordance with known mechanisms of the DAMA type (demand assigned multiple access).

Lastly, in a non-limiting embodiment, an amplification chain 100 may comprise a plurality of low noise amplifiers (LNA) 12, each cooperating with a plurality of signal divider devices 13 (demultiplexers), the latter each cooperating with a plurality of frequency converter circuits CONV, the set of converter circuits CONV cooperating with the amplification device HPA of the regeneration chain 100. Of course, other variants of this embodiment can be considered, such as only having a single low noise amplifier cooperating with a plurality of signal divider devices 13.

The invention thus provides the following advantages:
it makes it possible to reduce the guard band between two filters 19 of the same regeneration chain 100 and to thus increase the bandwidth which can be used to transmit the regenerated radiofrequency signals;
it is easily implemented;
it makes it possible to influence only a single component of the received signal, in this case the spatial component, without disturbing the frequential component;
it allows a terrestrial terminal to receive correctly the regenerated radiofrequency signal SP destined for said terminal without too much interference by the signal replica;
it makes it possible to reduce the cost of the multi-beam satellite thanks to the reduction in the number of components in the payload of said satellite;
it makes it possible to use only terrestrial terminals which are designed to manage only a single polarisation, a terrestrial terminal being located in a cell able to receive a radiofrequency signal of a given polarisation; such a terrestrial terminal is thus less complex and less expensive than a terrestrial terminal which has to manage two polarisations, as in the prior art where two cell plannings are used;
it makes it possible to achieve greater efficacy in terms of re-use of frequencies compared to the prior art since it uses a four-colour pattern instead of a six-colour pattern: With the four-colour pattern, more band frequency will be used for all cells over a given surface area compared to with a six-colour pattern. In a non-limiting example, for a frequency band of 500 MHz and for 100 cells, 25 GHz will thus be used for the four-colour pattern compared to 16.6 GHz for the six-colour pattern;
it makes it possible for end users to use the Internet by means of satellite telecommunication. This is useful in particular when the users are isolated without means for Internet access by a standard wireline.

The invention claimed is:

1. A forward link payload for a multi-beam satellite, a forward link allowing receipt of radiofrequency signals from at least one main terrestrial station so as to re-transmit said signals to at least one terrestrial terminal, said payload comprising:
one or more reception antennas configured to receive polarised radiofrequency signals;
a regeneration device configured to regenerate radiofrequency signals by filtering, frequency transposition and amplification; and
transmission antennas configured to transmit the regenerated radiofrequency signals to one or more terrestrial terminals, each signal being destined for a cell corresponding to a single basic coverage area wherein the regeneration device comprises a plurality of regeneration chains, each chain comprising an amplification device configured to amplify two radiofrequency signals having different frequency bands, and wherein the transmission antennas associated with a regeneration chain are configured to transmit two regenerated radiofrequency signals having orthogonal directions of polarisation and destined for cells belonging to a single cell planning which uses at least two frequency bands and two different polarisations and wherein the transmission antennas associated with a regeneration chain are configured to transmit two regenerated radiofrequency signals by said regeneration chain to two non-contiguous cells.

2. The payload according to claim 1, wherein the amplification device comprises a channel amplifier and a travelling wave tube amplifier.

3. A multi-beam satellite comprising a payload, including a forward link according to claim 1.

4. A telecommunications network for establishing radiofrequency links between at least one main terrestrial station and at least one terrestrial terminal via a multi-beam satellite, said network comprising at least one main terrestrial station, at least one terrestrial terminal, and a multi-beam satellite that comprises a payload according to claim 1.

\* \* \* \* \*